C. A. GLASS.
SHOCK ABSORBER.
APPLICATION FILED NOV. 8, 1915. RENEWED DEC. 12, 1916.

1,232,912.

Patented July 10, 1917.
2 SHEETS—SHEET 1.

Inventor
C. A. Glass

By _____, Attorneys

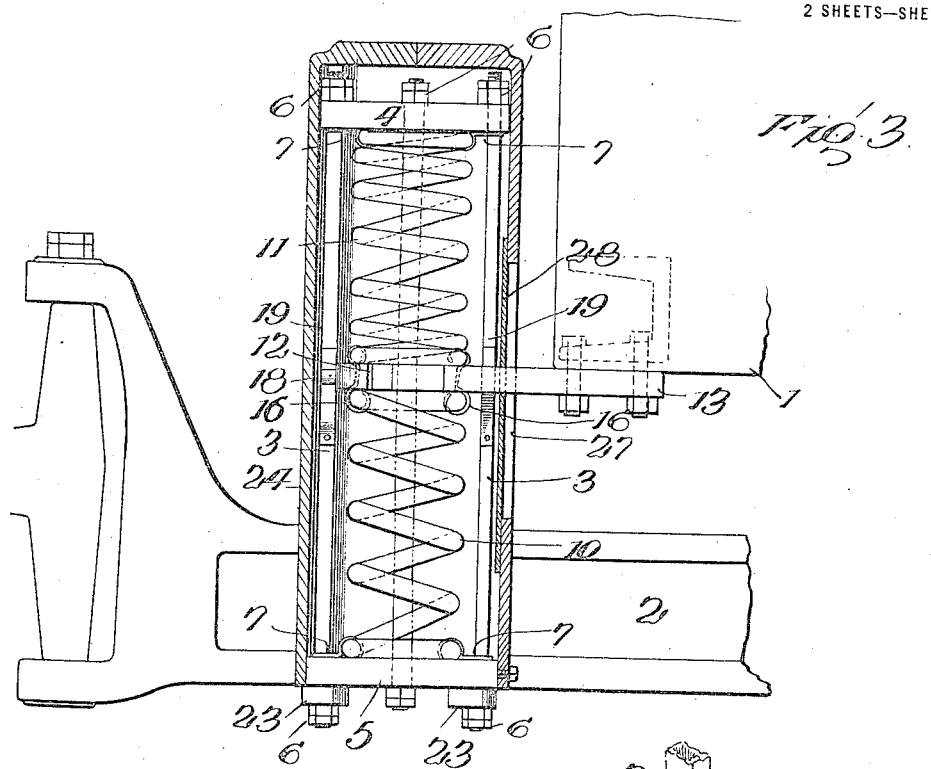

UNITED STATES PATENT OFFICE.

CHARLES A. GLASS, OF CHICAGO, ILLINOIS.

SHOCK-ABSORBER.

1,232,912.

Specification of Letters Patent.

Patented July 10, 1917.

Application filed November 8, 1915, Serial No. 60,333. Renewed December 12, 1916. Serial No. 136,542.

*To all whom it may concern:*

Be it known that I, CHARLES A. GLASS, a citizen of the United States, residing at Chicago, in the county of Cook and State of Illinois, have invented certain new and useful Improvements in Shock-Absorbers, of which the following is a specification.

This invention relates to shock-absorbers and has for its object the provision of a simple and efficient device which may be readily applied to automobiles or other vehicles to overcome the vibration caused by traveling over rough roads and which may be used as a substitute for or in connection with the usual elliptical or other springs with which the vehicle is equipped.

The invention seeks to provide a device for the stated purpose which will be protected against an accumulation of dust and will be so constructed and arranged as to respond quickly to unevennesses of the road. The invention also contemplates the provision of novel means for attaching the device to the vehicle axle and to the vehicle body and aims to improve the details of construction and arrangement of the parts to the end that the durability and efficiency of the same may be increased.

The invention is illustrated in the accompanying drawings and consists in certain novel features which will be hereinafter first fully described and then more particularly pointed out in the claims following the description.

In the drawings:

Fig. 3 is a vertical section taken substantially on the line 3—3 of Fig. 2;

Fig. 4 is a detail view of a retarding device;

Fig. 5 is a detail view of the clip for retaining the springs in position;

Fig. 6 is a detail view of the shield or shutter;

Fig. 7 is a detail plan view of one of the lower supporting arms;

Fig. 8 is a detail view of an emergency stop device.

Figure 1:
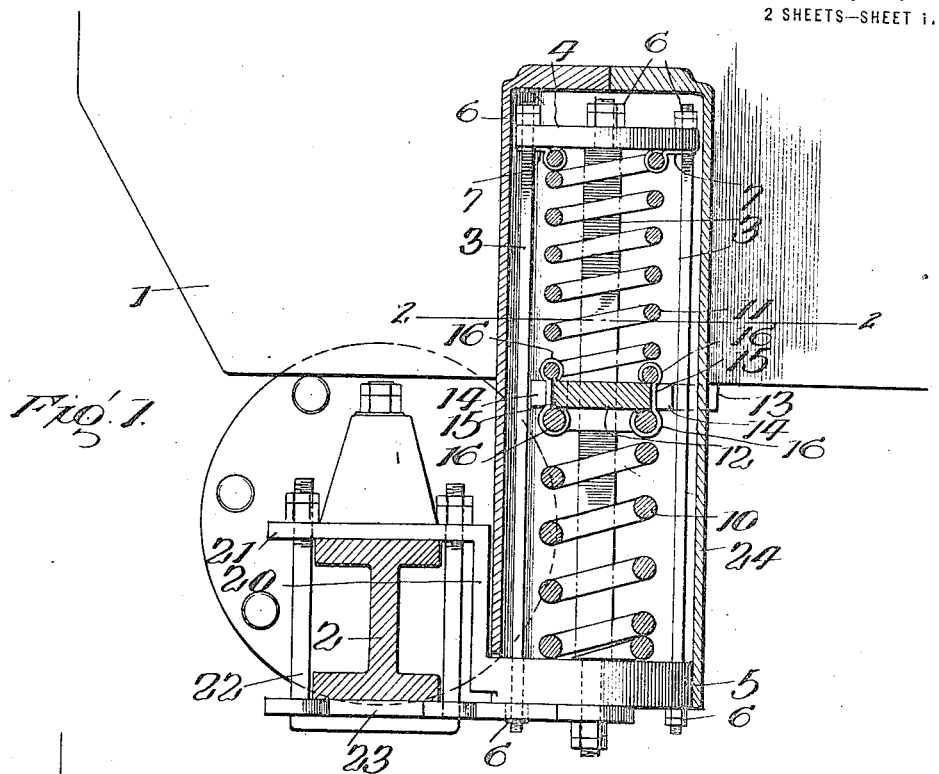
Figure 1 is a vertical sectional view of my improved shock absorber.

In the drawings, 1 designates a portion of the vehicle body and 2 designates the axle which may be of the usual or any preferred construction. In carrying out my invention, I employ a plurality of uprights or studs 3 which are spaced apart and have firmly attached to their upper and lower ends, respectively, the top and bottom plates 4 and 5. The extremities of the studs or uprights are reduced and angular so as to pass through angular openings in the top and bottom plates and beyond the said reduced angular portions securing nuts 6 are mounted upon the studs so as to firmly secure the plates thereon. Fitted around diametrically opposite studs, against the inner faces of the top and bottom plates, are clips 7 provided each at one end with an eye 8 to engage the stud and at its opposite end with an eye 9 disposed in a plane at right angles to the plane of the first mentioned eye so as to engage over the end coil of a spring which is disposed vertically within the space defined by these studs or uprights. The lower of these springs, 10, is somewhat stronger than the upper spring, 11, and the opposed adjacent ends of the springs are connected to a sliding platform or plate 12 which is provided with an extension or lateral arm 13 adapted to be secured to the vehicle body. At diametrically opposite points and between adjacent studs, this platform or sliding plate is constructed with notches 14 in its edge, which notches accommodate clips 15 having eyes 16 at their opposite ends to engage around the springs 10 and 11, as shown most clearly in Fig. 1. The sliding platform is also provided at diametrically opposite points with pairs of projecting pins 17 on which are mounted rollers 18 passing on opposite sides of adjacent studs. It will thus be readily seen that the studs serve to guide the platform in its vertical movements and also prevent twisting of the same so that it will be always in proper position to support the vehicle body with comfort to its occupants. Upon the studs 3, which are engaged by the rollers 18, I secure leaf-springs 19 which are each free at one end, one spring having its upper end free while the other spring has its lower end free. These springs are normally bowed and bear against the rollers, as shown in Fig. 4, so that, when the platform moves downwardly, one spring will retard the movement of the platform and thereby avoid sudden jars to the occupants of the vehicle, and on the upward movement of the platform, the opposite spring will perform the same function.

Figure 2:
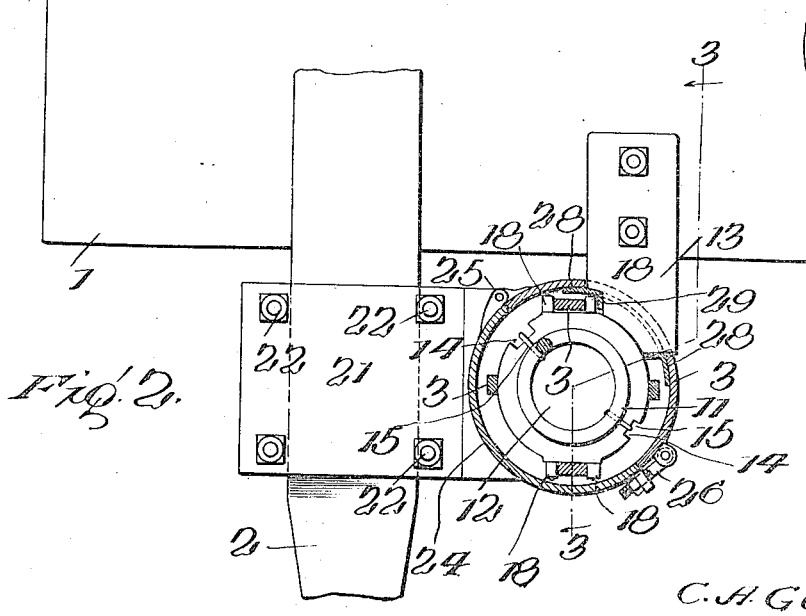
Fig. 2 is a horizontal section taken on the line 2—2 of Fig. 1.

The bottom plate 5 is provided with a lateral extension which constitutes the upper supporting arm. This extension passes vertically upward from the plate, as shown at 20, and is then carried horizontally outward or rearward, as shown at 21, to pass over the axle 2, as shown most clearly in Fig. 1. Openings are provided in this extension or supporting arm 21 to receive the threaded ends of U-shaped bolts 22 whereby the arm may be securely fastened to the axle. To more firmly secure the device in position and guard against lateral oscillation of the same, I provide lower supporting arms 23 which are each provided at one end with an opening to fit over the lower end of one of the studs 3 and is provided at its center and at its opposite end with openings to engage the sides of the U-shaped bolts 22, as will be readily understood upon reference to Fig. 1. These lower supporting arms pass beneath the axle and between the same and the cross bar or head of the U-shaped bolt, so that, when the bolt is secured in place, the device will be firmly fitted to the axle and will have a strong bearing against both the top and bottom of the same. It will be understood, of course, that the device may be secured directly on the top of the axle and the particular manner of attaching the device to the axle and the body may be varied according to the dimensions and arrangements of the various vehicles to which it may be applied. The springs and the parts coöperating therewith are inclosed by a housing 24 which will preferably be constructed in two similar parts, one of which will be firmly secured to the top and bottom plates 4 and 5 while the other will be hinged to such part to facilitate assembling of the device and the inspection, adjustment or repair of any of the working elements. In the drawings, more particularly Fig. 2, I have shown the members of the housing connected at one side by hinges 25 and held together at a diametrically opposite point by a latch bolt 26. This particular arrangement, however, is not essential. One member of the housing is provided with a vertical slot 27 to permit the arm 13 to pass through the housing to the vehicle body and a shutter or shield 28 is provided within the housing to cover the said slot and prevent access of dust or dirt therethrough to the interior of the housing. This shutter or shield consists of a plate of sheet metal or other suitable material having a slot between its ends whereby it may be passed over the arm 13 and provided at the ends of said slot with lugs 29 through which fastening devices may be inserted into the edge of the arm 13 or slide 12 to secure the shutter in place.

It is thought the operation of the device will be readily understood from the foregoing description taken in connection with the accompanying drawings. The springs 10 and 11 tend to hold the platform or slide 12 at about the center of the housing so that the body will be normally at the desired distance above the axle. As the vehicle passes over obstructions or depressions in the road, the springs 10 and 11 will at once expand or contract so as to conform to these irregularities or unevennesses in the surface of the road and thereby relieve the body 1 of the jars and shocks ordinarily due to this cause. The device may be used in connection with or as a substitute for the usual elliptical springs and may be readily applied to vehicles of any type. The sliding platform will be guided without undue friction by the several studs or uprights and will be prevented from oscillating laterally thereby. The parts are all simple in their construction and arrangement and are, consequently, not apt to get out of order. Should accident or other cause break or otherwise damage any of the parts, they may be easily repaired or replaced without requiring the provision of an entirely new shock-absorber.

It will be understood, of course, that the device may be inverted and the arm 13 secured to the axle while the member 21 is secured to the body without involving any departure from the invention.

If either the spring 10 or 11 should break, the platform may be held stationary within the housing by means of a yoke 30 which is adapted to be secured to one of the studs with its arms or terminals projecting respectively above and below the platform or slide. When this yoke, or a pair of such yokes, embraces the edge of the platform vertical movement of the platform will be prevented and the vehicle may then be driven until a new spring can be obtained and put in place.

Having thus described the invention, what is claimed as new is:

1. In a shock absorber, the combination of a support, a platform mounted slidably within the support, coiled springs disposed above and below the platform and between the same and the ends of the support, and bowed leaf-springs each secured at one end upon the support and extending in opposite directions and arranged to be engaged by the platform, one on the upward movement thereof and the other on the downward movement thereof.

2. In a shock-absorber, the combination of a plurality of uprights, a sliding platform disposed between the uprights, coiled springs disposed above and below the platform and connected to the same and to the uprights, leaf-springs secured upon the sides of some of the uprights, and rollers carried by the platform and adapted to ride upon the said leaf-springs.

3. In a shock-absorber, the combination of a plurality of uprights, top and bottom plates secured upon the ends of said uprights, clips having eyes fitted around some of the uprights against the inner faces of said top and bottom plates, a platform slidably mounted between the uprights, and springs disposed above and below the platform and bearing upon the same and having their terminals remote from the platform engaged and held by the said clips.

4. In a shock-absorber, the combination of a plurality of uprights, top and bottom plates secured to the ends of said uprights, clips arranged around said uprights against the inner faces of said top and bottom plates, a platform slidably mounted between and guided by the uprights, springs having their outer ends engaged in and held by the said clips, and clips fitted to the platform and engaging the inner ends of said springs.

In testimony whereof, I affix my signature.

CHARLES A. GLASS. [L. s.]

Copies of this patent may be obtained for five cents each, by addressing the "Commissioner of Patents, Washington, D. C."